United States Patent
Schmogrow et al.

(10) Patent No.: US 9,705,592 B1
(45) Date of Patent: Jul. 11, 2017

(54) IN-SERVICE SKEW MONITORING IN A NESTED MACH-ZEHNDER MODULATOR STRUCTURE USING PILOT SIGNALS AND BALANCED PHASE DETECTION

(71) Applicant: Infinera Corporation, Annapolis Junction, MD (US)

(72) Inventors: Rene Marcel Schmogrow, Santa Clara, CA (US); Arseny Vasilyev, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/091,437

(22) Filed: Apr. 5, 2016

(51) Int. Cl.
| | | |
|---|---|---|
| *H04B 10/00* | (2013.01) |
| *H04B 10/075* | (2013.01) |
| *H04B 10/516* | (2013.01) |
| *G02F 1/225* | (2006.01) |
| *G02F 1/21* | (2006.01) |

(52) U.S. Cl.
CPC ......... *H04B 10/075* (2013.01); *G02F 1/2255* (2013.01); *H04B 10/516* (2013.01); *G02F 2001/212* (2013.01)

(58) Field of Classification Search
CPC .............................. G06Q 40/025; G06Q 40/06
USPC ................................................. 398/182–201
See application file for complete search history.

(56) References Cited

U.S. PATENT DOCUMENTS

| | | | | |
|---|---|---|---|---|
| 6,278,539 B1 * | 8/2001 | Ooi | ....................... | G02F 1/0123 359/237 |
| 6,671,079 B2 * | 12/2003 | Fuller | ................ | H04B 10/5051 359/264 |
| 7,848,659 B2 * | 12/2010 | Miura | .................... | G02F 1/0123 398/183 |
| 7,876,491 B2 * | 1/2011 | Ide | ..................... | H04B 10/5053 359/245 |
| 8,412,047 B2 * | 4/2013 | Tanaka | ............... | H04B 10/5053 398/102 |
| 8,428,183 B2 * | 4/2013 | Khatana | ................ | H04L 27/364 332/102 |
| 8,472,810 B2 * | 6/2013 | Akiyama | ........... | H04B 10/5053 398/183 |
| 8,582,980 B2 * | 11/2013 | Nishihara | .......... | H04B 10/5162 398/183 |
| 8,693,891 B2 * | 4/2014 | Nishihara | ............ | H04B 10/505 398/184 |

(Continued)

*Primary Examiner* — Agustin Bello
(74) *Attorney, Agent, or Firm* — David L. Soltz; Muncy, Geissler, Olds & Lowe, P.C.

(57) ABSTRACT

An apparatus is provided. The apparatus may include a drive circuit that selectively supplies a first plurality of electrical signals and a second plurality of electrical signals to a modulation circuit. Based on the first plurality of electrical signals, the modulation circuit may output a first in-phase component being modulated in accordance with a first tone having a first frequency and a first quadrature component being modulated in accordance with a second tone having a second frequency different than the first frequency. Based on the second plurality of electrical signals, the modulation circuit may output a second optical signal having a second in-phase component being modulated in accordance with the second tone and a second quadrature component being modulated in accordance with the first tone.

20 Claims, 5 Drawing Sheets

(56) References Cited

U.S. PATENT DOCUMENTS

| | | | | |
|---|---|---|---|---|
| 8,705,981 B2 * | 4/2014 | Takahara | G02F 1/225 | 398/188 |
| 8,848,506 B2 * | 9/2014 | Kim | H04L 5/0007 | 370/208 |
| 8,867,927 B2 * | 10/2014 | Akiyama | G02F 1/0123 | 398/183 |
| 8,971,723 B2 * | 3/2015 | Le Taillandier De Gabory | H04B 10/0775 | 398/182 |
| 8,989,599 B2 * | 3/2015 | Le Taillandier De Gabory | H04B 10/0775 | 398/182 |
| 9,014,572 B2 * | 4/2015 | Akiyama | H04B 10/5053 | 398/192 |
| 9,020,363 B2 * | 4/2015 | Yasuda | H04B 10/50575 | 398/183 |
| 9,116,368 B2 * | 8/2015 | Kawakami | G02F 1/0123 | |
| 9,244,328 B2 * | 1/2016 | Nishimoto | H04B 10/50572 | |
| 9,419,720 B2 * | 8/2016 | Akiyama | G02F 1/0123 | |
| 2005/0117191 A1 * | 6/2005 | Griffin | G02F 1/0123 | 359/245 |
| 2006/0127104 A1 * | 6/2006 | Harley | H04B 10/5053 | 398/198 |
| 2006/0263097 A1 * | 11/2006 | Akiyama | H04B 10/505 | 398/188 |
| 2006/0263098 A1 * | 11/2006 | Akiyama | G02F 1/0123 | 398/188 |
| 2007/0212079 A1 * | 9/2007 | Ooi | H04B 10/505 | 398/198 |
| 2008/0181620 A1 * | 7/2008 | Sasaki | H04B 10/5561 | 398/198 |
| 2009/0041473 A1 * | 2/2009 | Nishihara | H04B 10/5051 | 398/188 |
| 2011/0229148 A1 * | 9/2011 | Nishihara | H04B 10/5053 | 398/183 |
| 2011/0229150 A1 * | 9/2011 | Nishihara | H04B 10/505 | 398/195 |
| 2013/0336647 A1 * | 12/2013 | Le Taillandier De Gabory | H04B 10/0775 | 398/25 |
| 2015/0188642 A1 * | 7/2015 | Sun | H04J 14/02 | 398/202 |
| 2016/0112138 A1 * | 4/2016 | Alfiad | H04B 10/503 | 398/182 |

* cited by examiner

IN-SERVICE SKEW MONITORING IN A NESTED MACH-ZEHNDER MODULATOR STRUCTURE USING PILOT SIGNALS AND BALANCED PHASE DETECTION

INTRODUCTION

Aspects of this disclosure relate generally to communication systems, and more particularly to in-service skew monitoring in a nested optical modulator structure.

Optical signals are increasingly used to communicate data in telecommunication systems. Optical communication systems are capable of high-speed data transfer. Moreover, optical signals are generally of high quality because, for example, they are not distorted by electromagnetic fields.

At a transmission side of an optical network, an optical modulation system may be used to convert a data signal into a phase-modulated and amplitude-modulated optical signal. The optical signal may be transmitted to a receiver side of the optical network via, for example, an optical fiber. At the receiver side of the optical network, an optical receiver may receive and demodulate the data signal.

A nested optical modulator structure may include an in-phase (I) modulator and a quadrature (Q) modulator. While the optical modulation system is in service—i.e., while it is transmitting data—it is preferable that the I and Q data paths are synchronized in time. A condition known as skew arises when the I-modulator and the Q-modulator data patterns become offset from each other in time.

Skew may be caused by aging of components or environmental effects. For example, a digital-to-analog converter used to transmit a modulation signal to one of the modulators may have a different processing delay than a digital-to-analog converter used to transmit a modulation signal to another of the modulators. Moreover, the behavior of these components may change over time.

To counter the effects of skew, deskewing may be performed. Conventionally, deskewing may be performed during a calibration phase of the optical modulation system. For example, the super (or parent) Mach-Zehnder modulator (MZM) bias may be set to 0° and a calibration signal may be sent through both of the I-modulator and the Q-modulator. Then, a phase difference between the I and Q signals may be measured at the output of the optical modulation system using a simple, low-speed photodetector. The measured phase difference may be converted to a time delay (skew). The calculated value may be used to correct the skew, for example, through the use of re-configurable electronic filters in the I and Q data paths. However, this procedure cannot be performed while the optical modulation system is in service, since it requires tuning the super-MZM away from the ideal bias phase of 90°. Accordingly, new methods for more flexible in-service skew monitoring are required.

SUMMARY

In accordance with one aspect of the disclosure, an apparatus is provided. The apparatus comprises, for example, a drive circuit that selectively supplies a first plurality of electrical signals and a second plurality of electrical signals and a modulation circuit coupled to the drive circuit. Based on the first plurality of electrical signals, the modulation circuit outputs a first optical signal having a first in-phase component and a first quadrature component, the first in-phase component being modulated in accordance with a first tone having a first frequency and the first quadrature component being modulated in accordance with a second tone having a second frequency different than the first frequency. Based on the second plurality of electrical signals, the modulation circuit outputs a second optical signal having a second in-phase component and a second quadrature component, the second in-phase component being modulated in accordance with the second tone having the second frequency and the second quadrature component being modulated in accordance with the first tone having the first frequency.

In accordance with another aspect of the disclosure, another apparatus is provided. The apparatus comprises, for example, a drive circuit that supplies, during a first time interval, first in-phase drive signals that are modulated in accordance with a first electrical tone and first quadrature drive signals that are modulated in accordance with a second electrical tone, the first electrical tone having a first frequency and the second electrical tone having a second frequency. The drive circuit further supplies, during a second time interval, second in-phase drive signals that are modulated in accordance with the second electrical tone having the second frequency and second quadrature drive signals that are modulated in accordance with the first electrical tone having the first frequency, the first frequency being different than the second frequency. Based on the first in-phase and first quadrature drive signals supplied during the first time interval, a modulator outputs a first optical signal including a first in-phase component modulated to have a first optical tone at the first frequency and a first quadrature component modulated to have a second optical tone at the second frequency. Based on the second in-phase and second quadrature drive signals during the second time interval, the modulator outputs a second optical signal including a second in-phase component modulated to have the second optical tone at the second frequency and a second quadrature component modulated to have the first optical tone at the second frequency.

In accordance with yet another aspect of the disclosure, another apparatus is provided. The apparatus comprises, for example, a drive circuit that selectively supplies a first plurality of electrical signals and a second plurality of electrical signals, a modulation circuit coupled to the drive circuit, and a detector circuit that supplies an error signal based on a portion of at least one of the first and second optical signals, the detector circuit supplying third electrical signals to the modulation circuit based on the error signal. Based on the first plurality of electrical signals, the modulation circuit outputs a first optical signal having a first in-phase component and a first quadrature component, the first in-phase component being modulated in accordance with a first tone having a first frequency and the first quadrature component being modulated in accordance with a second tone having a second frequency different than the first frequency. Based on the second plurality of electrical signals, the modulation circuit outputs a second optical signal having a second in-phase component and a second quadrature component, the second in-phase component being modulated in accordance with the second tone having the second frequency and the second quadrature component being modulated in accordance with the first tone having the first frequency.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
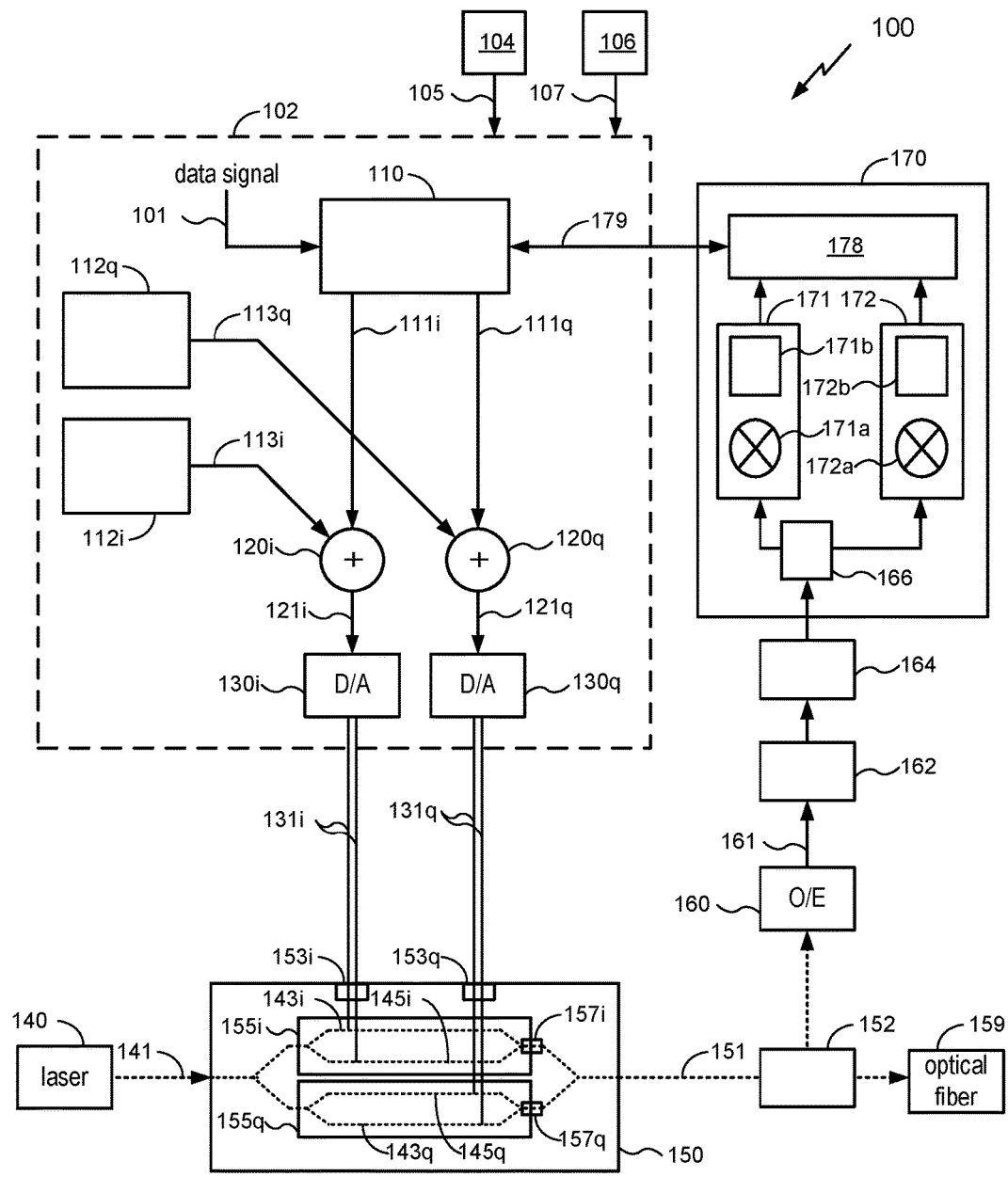
FIG. 1 generally illustrates an optical modulation system in accordance with an aspect of the disclosure.

The present disclosure relates generally to communication systems, and more particularly to in-service skew monitoring in an optical modulation system.

An optical modulation system may include a drive circuit that supplies a plurality of electrical signals to a modulation circuit. The drive circuit may receive an electrical data signal that carries data, and may generate a plurality of electrical signals. The plurality of electrical signals may be supplied to an in-phase (I) modulator and a quadrature (Q) modulator included in the modulation circuit. The modulation circuit may then output an optical signal that carries the data. While the optical modulation system is in service—i.e., while the modulation circuit is transmitting a data-carrying optical signal—it is preferable that the I and Q data paths of the optical modulation system are synchronized in time. A condition known as skew arises when the I-modulator and the Q-modulator data exhibit a phase difference (also referred to as a differential delay) between the I and Q data paths. If skew can be detected, it can counteracted by offsetting the detected phase difference between the I and Q data paths.

In accordance with an aspect of the disclosure, a detector circuit may measure the optical signal output by the modulation circuit, for example, by generating a photocurrent. Based on the photocurrent, the detector circuit may generate an error signal that indicates a skew of the optical modulation system and may supply the error signal to the drive circuit. The drive circuit may then offset the skew of the optical modulation system based on the error signal. In order to detect the skew, the drive circuit may be configured to add an in-phase pilot signal and a quadrature pilot signal to the plurality of electrical signals that are supplied to the modulation circuit. During a first interval, frequency components associated with a first frequency may be added to the in-phase pilot signal and frequency components associated with a second frequency may be added to the quadrature pilot signal. The first frequency and the second frequency may related in accordance with a predetermined pilot frequency ratio. During a second interval subsequent to the first interval, the frequency components associated with the first frequency may be added to the quadrature pilot signal and the frequency components associated with the second frequency may be added to the in-phase pilot signal. As a result of the different pilot signals applied during the first and second intervals, the detector circuit may be configured to determined, based on the output of the modulating circuit, a skew of the optical modulation system.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described in the present disclosure may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 generally illustrates an optical modulation system 100 in accordance with an aspect of the disclosure.

The optical modulation system 100 depicted in FIG. 1 may include a data signal 101. The data signal 101 may be, for example, an electrical data signal that the optical modulation system 100 is configured to receive from an external source.

The optical modulation system 100 may further include a drive circuit 102 to which the data signal 101 may be provided. Other signals may also be provided to the drive circuit 102. For example, the optical modulation system 100 may include a clock 104 that generates a clock signal 105 and supplies the clock signal 105 to the drive circuit 102. The optical modulation system 100 may further include a power supply 106 that generates a power supply signal 107 and supplies the power supply signal 107 to the drive circuit 102.

The drive circuit 102 may include a data drive signal generator 110. The data signal 101 received by the drive circuit 102 may be provided to the data drive signal generator 110. The data drive signal generator 110 may generate an in-phase data drive signal 111$i$ and a quadrature data drive signal 111$q$. The in-phase data drive signal 111$i$ and the quadrature data drive signal 111$q$ may be separated by a differential delay $\Delta\tau$.

A non-zero value of the differential delay $\Delta\tau$ may be referred to as skew. Skew may arise as a result of, for example, miscalibration of the optical modulation system 100, aging of the components of the optical modulation system 100, or exogenous forces acting on the optical modulation system 100. However, if skew can be monitored, then an adjustment can be applied to limit the magnitude of the differential delay $\Delta\tau$. If skew can be monitored while the optical modulation system is in service, then significant deviations in the IQ bias may be prevented, recalibrations of the optical modulation system 100 may be avoided, and the useful lifetime of the various components of the optical modulation system may be extended.

In order to facilitate in-service skew monitoring within the optical modulation system 100, the drive circuit 102 may be provided with an in-phase pilot signal generator 112$i$ and a quadrature pilot signal generator 112$q$. The in-phase pilot signal generator 112$i$ may generate an in-phase pilot signal 113$i$ and the quadrature pilot signal generator 112$q$ may generate a quadrature pilot signal 113q. The in-phase pilot signal 113i and the quadrature pilot signal 113q may be modulated in accordance with a first electrical tone having a first frequency or a second electrical tone having a second frequency, as will be described in greater detail below. The in-phase pilot signal 113i and the quadrature pilot signal 113q may be denoted $d_I(t)$ and $d_Q(t)$, respectively, and may be functions of time t. The in-phase pilot signal 113i may take the form shown in Equation 1 and the quadrature pilot signal 113q may take the form shown in Equation 2:

$$d_I(t) = A_I \left[ \frac{1 + m_I \cos(\omega_I t + \varphi_I)}{2} \right] \cos(\omega_c t + \varphi_c); \quad \text{Eq. (1)}$$

$$d_Q(t) = A_Q \left[ \frac{1 + m_Q \cos(\omega_Q t + \varphi_Q)}{2} \right] \cos(\omega_c t + \varphi_c). \quad \text{Eq. (2)}$$

For simplicity of illustration and without loss of generality, the respective modulation indices $m_I$ and $m_Q$ may be set to one, and the respective amplitudes $A_I$ and $A_Q$ may be set to one. Moreover, the phases $\phi_I$, $\phi_Q$, and $\phi_c$ may be set to zero. Accordingly, the in-phase pilot signal 113i may take the form shown in Equation 3 and the quadrature pilot signal 113q may take the form shown in Equation 4:

$$d_I(t) = \left[ \frac{1 + \cos(\omega_I t)}{2} \right] \cos(\omega_c t); \quad \text{Eq. (3)}$$

$$d_Q(t) = \left[ \frac{1 + \cos(\omega_Q t)}{2} \right] \cos(\omega_c t). \quad \text{Eq. (4)}$$

It will be understood from Equation 3 and Equation 4 that the in-phase pilot signal 113i and the quadrature pilot signal 113q may have a carrier frequency $\omega_c$ that is amplitude-modulated in accordance with an in-phase pilot frequency $\omega_I$ and a quadrature pilot frequency $\omega_Q$, respectively. Accordingly, the in-phase pilot signal 113i may include a frequency component associated with the in-phase pilot frequency $\omega_I$ and the quadrature pilot signal 113q may include a frequency component associated with a quadrature pilot frequency $CO_Q$.

The optical modulation system 100 may further include an in-phase signal adder 120i and a quadrature signal adder 120q. The in-phase signal adder 120i may add the in-phase pilot signal 113i to the in-phase data drive signal 111i to generate a sum signal 121i. Similarly, the quadrature signal adder 120q may add the quadrature pilot signal 113q to the quadrature data drive signal 111q to generate a sum signal 121q.

The drive circuit 102 may generate a plurality of electrical signals. In some implementations, the plurality of electrical signals may be a plurality of analog electrical signals. Accordingly, the drive circuit 102 depicted in FIG. 1 may include an in-phase digital-to-analog converter 130i and a quadrature digital-to-analog converter 130q. Moreover, the plurality of electrical signals may include one or more in-phase modulating signals 131i and one or more quadrature modulating signals 131q. The one or more in-phase modulating signals 131i may be generated by the in-phase digital-to-analog converter 130i and the one or more quadrature modulating signals 131q may be generated by the quadrature digital-to-analog converter 130q.

In the implementation shown in FIG. 1, the drive circuit 102 may be implemented as an application-specific integrated circuit (ASIC). The data signal 101 may be received by, generated by, and/or processed within the ASIC. Moreover, one or more of the data drive signal generator 110, the in-phase pilot signal generator 112i, the quadrature pilot signal generator 112q, the in-phase signal adder 120i, and the quadrature signal adder 120q may be implemented on the ASIC. Accordingly, the in-phase sum signal 121i and the quadrature sum signal 121q may be digital sum signals. In the implementation shown in FIG. 1, the in-phase sum signal 121i and the quadrature sum signal 121q, respectively, may be converted into one or more in-phase modulating signals 131i and one or more quadrature modulating signals 131q by an in-phase digital-to-analog converter 130i and a quadrature digital-to-analog converter 130q, respectively. The in-phase digital-to-analog converter 130i and the quadrature digital-to-analog converter 130q may also be provided in the ASIC.

It will be understood that in accordance with other aspects of the disclosure, other digital components may be used to implement the components of the drive circuit 102, for example, a field-programmable gate array (FPGA). It will be further understood that any of the components of the drive circuit 102 depicted in FIG. 1 may instead be implemented using analog components.

The optical modulation system 100 may further include a laser 140 that generates an optical carrier signal 141. The optical carrier signal 141 may be, for example, continuous wave light. The optical carrier signal 141 may be provided to a modulation circuit 150. The modulation circuit 150 may include two nested optical modulators, for example, a first optical modulator and a second optical modulator. The first and second optical modulators may be an in-phase optical modulator 155i and a quadrature optical modulator 155q. The in-phase optical modulator 155i and the quadrature optical modulator 155q may be Mach-Zehnder modulators. The optical carrier signal 141 may be split into a first in-phase optical carrier signal 143i, a second in-phase optical carrier signal 145i, a first quadrature optical carrier signal 143q, and a second quadrature optical carrier signal 145q. The in-phase optical modulator 155i may include a connection 157i and the quadrature optical modulator 155q may include a connection 157q.

The modulation circuit 150 may include one or more in-phase modulating signal electrodes 153i configured to receive the one or more in-phase modulating signals 131i and one or more quadrature modulating signal electrodes 153q configured to receive the one or more quadrature modulating signals 131q. The one or more in-phase modulating signal electrodes 153i may be further configured to route the one or more in-phase modulating signals 131i to the first in-phase optical carrier signal 143i and the second in-phase optical carrier signal 145i. The one or more quadrature modulating signal electrodes 153q may be further configured to route the one or more quadrature modulating signals 131q to the first quadrature optical carrier signal 143q and the second quadrature optical carrier signal 145q. The in-phase optical modulator 155i of the modulation circuit 150 may modulate the optical carrier signal 141 based on the one or more in-phase modulating signals 131i. Likewise, the quadrature optical modulator 155q of the modulation circuit 150 may modulate the optical carrier signal 141 based on the one or more quadrature modulating signals 131q. The respective outputs of the in-phase optical modulator 155i and the quadrature optical modulator 155q may be combined to generate an optical signal 151.

FIG. 1 shows two arrows representing the one or more in-phase modulating signal 131i and the one or more quadrature modulating signal 131q, respectively. In some implementations, such as in push-pull optical modulators, the one or more in-phase modulating signals 131i and the one or more quadrature modulating signals 131q may each be one signal. In other implementations, such as in dual-drive optical modulators, the one or more in-phase modulating signals 131i and the one or more quadrature modulating signals 131q may each include a differential signal, for example, a positive differential signal and a negative differential signal equal and opposite to the positive differential signal. It will be understood that the in-phase optical modulator 155i and the quadrature optical modulator 155q may be push-pull optical modulators or dual-drive modulators without departing from the scope of the present disclosure. It will be further understood that the one or more in-phase modulating signals 131i and the one or more quadrature modulating signals 131q may be one signal each, or may each comprise a signal pair, as in a differential signal.

The optical signal 151 may be an output of the optical modulation system 100 and may be provided to an element of an external optical communications system, for example, an optical fiber 159, which transmits the optical signal 151 to a receiver side of an optical communications system. The modulation circuit 150 may generate the optical signal 151 by modulating the optical carrier signal 141 in accordance with the one or more in-phase modulating signals 131i and the one or more quadrature modulating signals 131q. As a result, the optical signal 151 may include frequency components associated with the optical carrier signal 141, the in-phase data drive signal 111i and the quadrature data drive signal 111q, and the pilot signal frequencies, in particular, the common carrier frequency $\omega_c$, the in-phase pilot frequency $\omega_I$ and the quadrature pilot frequency $\omega_Q$.

To implement skew monitoring within the optical modulation system 100, a portion of the optical signal 151 may be tapped and provided to a photodetector 160. Accordingly, the optical modulation system 100 may further include, for example, an optical splitter or beam splitter 152. The photodetector 160 may then generate a photocurrent 161 based on the optical signal 151. The photodetector 160 may generate the photocurrent 161 by converting the optical signal 151 into an electrical signal representative of the optical signal 151. It will be understood that the photocurrent 161 may include components at the in-phase pilot frequency $\omega_I$ and the quadrature pilot frequency $\omega_Q$.

Also depicted in FIG. 1 are a filter 162 for filtering the photocurrent 161 and an analog-to-digital converter 164 for converting the photocurrent 161 to a digital signal.

Figure 4:
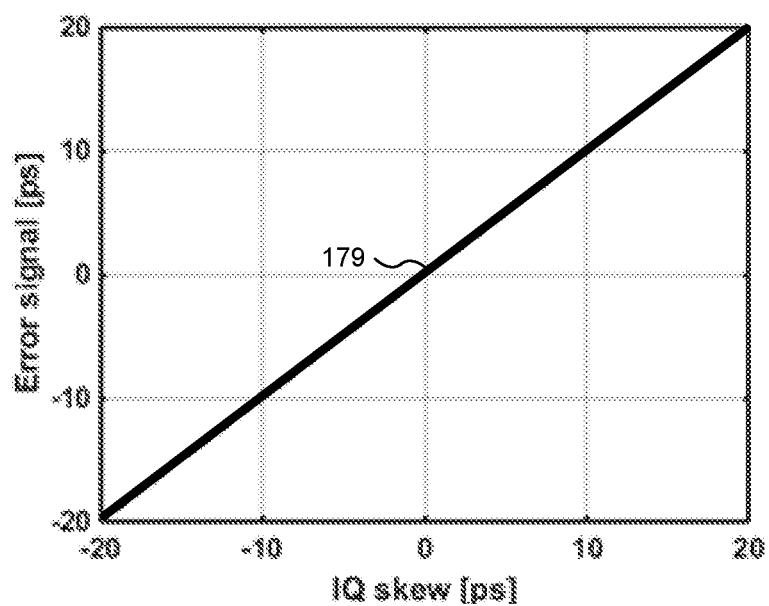
FIG. 4 generally illustrates an error signal depicted as a function of a differential delay.

The optical modulation system 100 may further include a detector circuit 170. The detector circuit 170 may generate an error signal 179 that is provided to the modulation circuit 150. In particular, the error signal 179 may indicate a skew of the optical modulation system 100, a bias of the optical modulation system 100, a differential delay $\Delta\tau$ of the of the optical modulation system 100, or any other signal suitable for adjusting skew within the data drive signal generator 110. For example, the error signal 179 may be depicted as a function of a differential delay between I and Q, (which may be referred to as "IQ skew") as depicted in FIG. 4. In FIG. 4, the error signal 179 is depicted in terms of picoseconds (ps), and is directly proportional to the IQ skew, also depicted in terms of picoseconds (ps).

Although the detector circuit 170 is depicted as being distinct from the drive circuit 102, it will be understood that the drive circuit 102 and the detector circuit 170 may be implemented on a single ASIC or may be implemented separately, as shown in FIG. 1. In some implementations, for example, the detector circuit 170 may be implemented using a field-programmable gate array (FPGA). Moreover, the operations performed by the detector circuit 170 may be performed in the analog and/or the digital domain.

In particular, the detector circuit 170 may extract components of the photocurrent 161 at the in-phase pilot frequency $\omega_I$ and the quadrature pilot frequency $\omega_Q$. The extracting may be performed by a first complex correlator 171 and a second complex correlator 172, respectively. As will be understood from FIG. 1, the first complex correlator 171 and the second complex correlator 172 may be implemented within the detector circuit 170. The first complex correlator 171 may generate a first complex value denoted $x_A$ and the second complex correlator 172 may generate a second complex value $x_B$. The first complex value $x_A$ and the second complex value $x_B$ may be provided to a skew processor 178, which may use the first complex value $x_A$ and the second complex value $x_B$ to generate the error signal 179.

The first complex correlator 171 and the second complex correlator 172 may generate complex values based on the photocurrent 161. The photocurrent 161 may be split by a splitter 166 and provided to both the first complex correlator 171 and the second complex correlator 172. The first complex correlator 171 and the second complex correlator 172 may use the same series of operation to generate complex values. The operations, described as they would be performed by the first complex correlator 171, may include the following steps.

First, the first complex correlator 171 may multiply the photocurrent 161 by cos($\omega$t), wherein co is a demodulation frequency and t is time. The multiplying may be performed by, for example, a first multiplier 171a. The product of the multiplying is then integrated over a correlation period to obtain a first integration result. The integrating may be performed by, for example, a first integrator 171b.

Second, the first complex correlator 171 multiplies the photocurrent 161 by sin($\omega$t), wherein co is the demodulation frequency and t is time. The multiplying may be performed by the first multiplier 171a. The product of the multiplying is then integrated over the correlation period to obtain a second integration result. The integrating may be performed by the first integrator 171b. The second integration result is then multiplied by imaginary number j.

Third, the first complex correlator 171 adds the first integration result and the product of imaginary number j and the second integration result.

The same operations may be performed by the second complex correlator 172, including, for example, a second multiplier 172a and a second integrator 172b.

Accordingly, the first complex value $x_A$ may take the form shown in Equation 5 and the second complex value $x_B$ may take the form shown in Equation 6:

$$x_A(\tau_I) \sim e^{j(<F[\omega_I]-\omega_I \tau_I)} \qquad \text{Eq. (5)}$$

$$x_B(\tau_Q) \sim e^{j(<F[\omega_Q]-\omega_Q \tau_Q)} \qquad \text{Eq. (5)}$$

The differential delay $\Delta\tau$ (which is an indicator of skew, as noted above) may be defined in terms of an in-phase delay $\tau_I$ and a quadrature delay $\tau_Q$, where $\Delta\tau=\tau_I-\tau_Q$. As will be understood from Equation 5 and Equation 6, the first complex value $x_A(\tau_I)$ may be a function of the in-phase delay $\tau_I$ and the second complex value $x_B(\tau_Q)$ may be a function of the quadrature delay $\tau_Q$. Both the in-phase delay $\tau_I$ and the quadrature delay $\tau_Q$ may include a common delay $\tau_{common}$ caused by a latency between tone generation (for example, at the in-phase pilot signal generator 112$i$ and the quadrature pilot signal generator 112$q$) and tone processing (for example, at the first complex correlator 171 and the second complex correlator 172).

As will be further understood from Equation 5 and Equation 6, the first complex value $x_A(\tau_I)$ and the second complex value $x_B(\tau_Q)$ may further include frequency-dependent phases $<F[\omega_I]$ and $<F[\omega_Q]$, respectively. These phases may be generated due to a range of mechanisms, including, but not limited to, frequency-dependent response of the detector circuit 170, and phase errors due to using separate clocks in the in-phase pilot signal generator 112$i$, quadrature pilot signal generator 112$q$, and/or detector circuit 170.

The skew processor 178 may determine skew by measuring the differential delay $\Delta\tau$, where $\Delta\tau = \tau_I - \tau_Q$. However, as will be understood from Equation 5 and Equation 6, the respective values of the in-phase delay $\tau_I$ and the quadrature delay $\tau_Q$ may be obscured by the common delay $\tau_{common}$ and the frequency-dependent phases $<F[\omega_I]$ and $<F[\omega_Q]$.

In order to determine the values of the in-phase delay $\tau_I$ and the quadrature delay $\tau_Q$, the optical modulation system 100 may select and manipulate the in-phase pilot frequency $\omega_I$ and quadrature pilot frequency $\omega_Q$ such that the effects of the common delay $\tau_{common}$ and the frequency-dependent phases $<F[\omega_I]$ and $<F[\omega_Q]$ can be eliminated.

Figure 2:
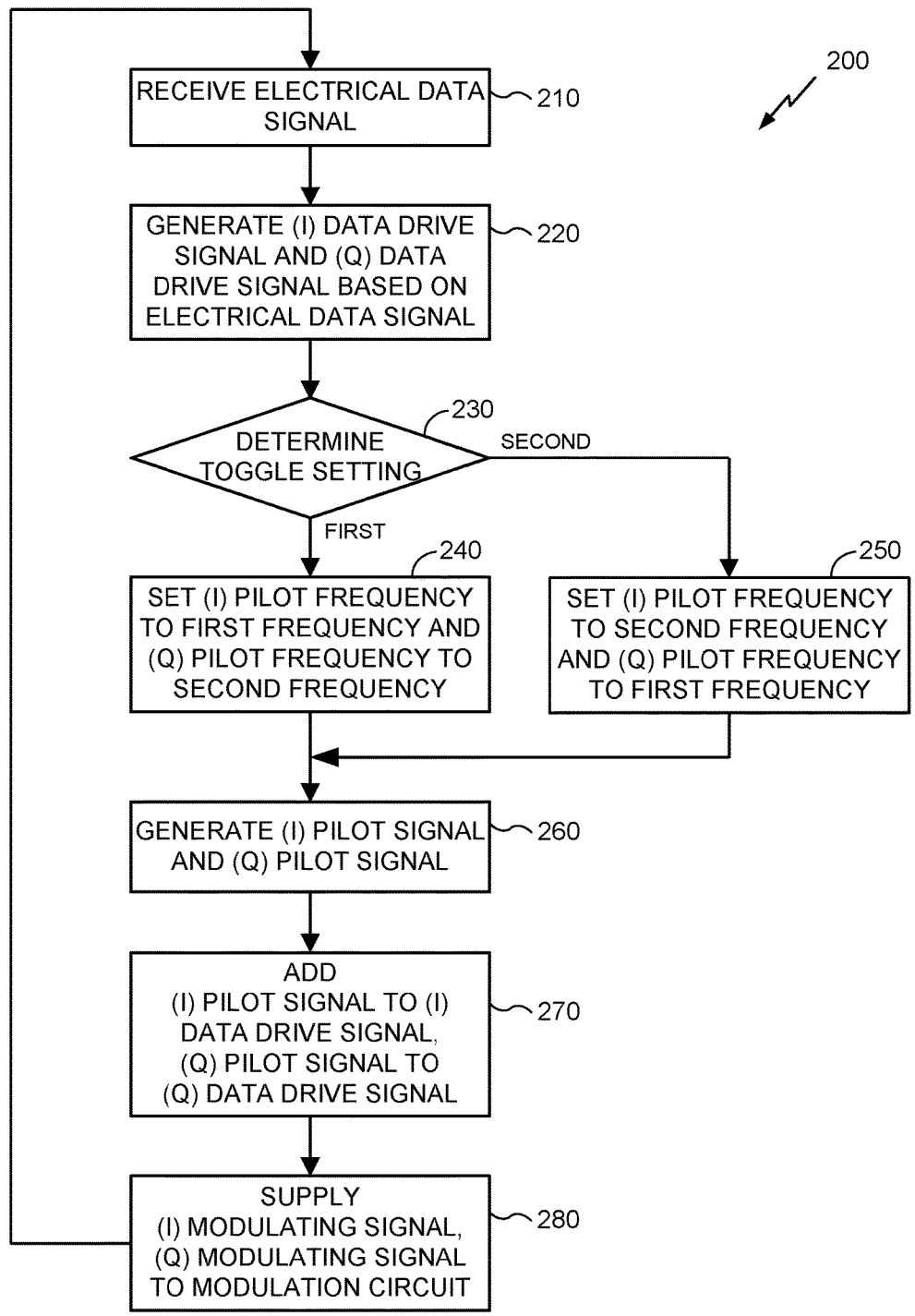
FIG. 2 generally illustrates a method for generating a plurality of pilot signals.

FIG. 2 generally illustrates a method 200 for generating a plurality of pilot signals. The method 200 may be performed while the optical modulation system 100 is in-service. The method 200 will be described below as it would be performed by one or more specific components of the optical modulation system 100 depicted in FIG. 1, in particular, the drive circuit 102. However, it will be understood that the method 200 may be performed by any suitable element or elements in the analog and/or the digital domain.

At 210, the drive circuit 102 receives the electrical data signal 101.

At 220, the drive circuit 102 generates an in-phase data drive signal 111$i$ and a quadrature data drive signal 111$q$ based on the electrical data signal 101. The in-phase data drive signal 111$i$ and the quadrature data drive signal 111$q$ may be configured to drive the modulator circuit 150 such that the modulator circuit 150 outputs the optical signal 151. The optical signal 151 may carry data from the electrical data signal 101. The optical signal 151 may have an in-phase component and a quadrature component.

The in-phase data drive signal 111$i$ and the quadrature data drive signal 111$q$ generated at 220 may be synchronized. Alternatively, the relative phases of the in-phase data drive signal 111$i$ and the quadrature data drive signal 111$q$ may be adjusted to offset a skew of the optical modulation system 100, for example, a skew detected by the detector circuit 270.

At 230, the drive circuit 102 determines a toggle setting of an in-phase pilot frequency $\omega_I$ and a quadrature pilot frequency $\omega_Q$. As will be described in greater detail below, the in-phase pilot frequency $\omega_I$ and the quadrature pilot frequency $\omega_Q$ may be set in a first manner during a first interval of time and may be set in a second manner during a second interval of time subsequent to the first interval. If, at 230, the drive circuit 102 determines a first toggle setting, then the method 200 proceeds to 240. If, at 230, the drive circuit 102 determines a first toggle setting, then the method 200 proceeds to 250.

The determining at 230 may be based on a toggle signal received from the optical modulation system 100. For example, the toggle signal may indicate a first value or a second value, and the drive circuit 102 may determine the first toggle setting in response to the first value and the second toggle setting in response to the second value. Alternatively, the first interval and the second interval may have a set duration, and the drive circuit 102 may perform the determining at 230 based on the clock signal 105. For example, if the clock signal repeats a certain number of times or for a predetermined duration, the drive circuit 102 may toggle the toggle setting from a first toggle setting to a second toggle setting (or vice-versa), and reset the counter.

At 240, the drive circuit 102 sets an in-phase pilot frequency $\omega_I$ to a first frequency $\omega_1$ and a quadrature pilot frequency $\omega_Q$ to a second frequency $\omega_2$, as shown in Equation 7 and Equation 8. Moreover, a relation between the first frequency $\omega_1$ and the second frequency $\omega_2$ may be based on a pilot frequency ratio n/m, as shown in Equation 9:

$$\omega_I = \omega_1; \qquad \text{Eq. (7)}$$

$$\omega_Q = \omega_2; \qquad \text{Eq. (8)}$$

$$\omega_1 = \left[\frac{n}{m}\right]\omega_2. \qquad \text{Eq. (9)}$$

Moreover, n and m may be selected such that n and m are both integers. After the setting at 240, the method 200 may proceed to 260.

At 250, the drive circuit 102 sets the in-phase pilot frequency $\omega_I$ to the second frequency $\omega_2$ and the quadrature pilot frequency $\omega_Q$ to a first frequency $\omega_1$, as shown in Equation 12 and Equation 13:

$$\omega_I = \omega_2; \qquad \text{Eq. (12)}$$

$$\omega_Q = \omega_1. \qquad \text{Eq. (13)}$$

It will be understood that a relation between the first frequency $\omega_1$ and the second frequency $\omega_2$ may still be based on the pilot frequency ratio n/m, as shown in Equation 9. After the setting at 240, the method 200 may proceed to 260.

At 260, the drive circuit 102 generates the in-phase pilot signal 113$i$ and the quadrature pilot signal 113$q$. The in-phase pilot signal 113$i$ may be generated by the in-phase pilot signal generator 112$i$ and the quadrature pilot signal 113$q$ may be generated by the quadrature pilot signal generator 112$q$. The in-phase pilot signal 113$i$ may take the form shown in Equation 10 and the quadrature pilot signal 113$q$ may take the form shown in Equation 11:

$$d_I(t) = \left[\frac{1 + \cos(\omega_I t)}{2}\right]\cos(\omega_c t); \qquad \text{Eq. (10)}$$

$$d_Q(t) = \left[\frac{1 + \cos(\omega_Q t)}{2}\right]\cos(\omega_c t). \qquad \text{Eq. (11)}$$

It will be understood that the in-phase pilot frequency $\omega_I$ and the quadrature pilot frequency $\omega_Q$ shown in Equation 10 and Equation 11 may be set differently depending on the outcome of the determining at 230. If the first toggle setting is determined at 230, then the in-phase pilot frequency $\omega_I$ will be set to the first frequency $\omega_1$ and the quadrature pilot frequency $\omega_Q$ will be set to the second frequency $\omega_2$, but if the second toggle setting is determined at 230, then the in-phase pilot frequency $\omega_I$ will be set to the second frequency $\omega_2$ and the quadrature pilot frequency $\omega_Q$ will be set to the first frequency $\omega_1$.

In some implementations, the in-phase data drive signal 111i and the quadrature data drive signal 111q may be higher-frequency than each of the first electrical tone and the second electrical tone. Moreover, the first electrical tone and the second electrical tone may be higher-frequency than the carrier frequency $\omega_c$.

At 270, the drive circuit 102 may add the in-phase pilot signal 113i to the in-phase data drive signal 111i and the quadrature pilot signal 113q to the quadrature data drive signal 111q. The adding may be performed by the in-phase signal adder 120i and the quadrature signal adder 120q, respectively. The adding of the in-phase pilot signal 113i to the in-phase data drive signal 111i and the adding of the quadrature pilot signal 113q to the quadrature data drive signal 111q may result in a plurality of electrical signals. For example, the adding of the in-phase pilot signal 113i to the in-phase data drive signal 111i may result in the in-phase modulating signal 131i. Moreover, the adding of the quadrature pilot signal 113q to the quadrature data drive signal 111q may result in the quadrature modulating signal 131q.

At 280, the drive circuit 102 may supply the plurality of electrical signals to the modulator circuit 150. For example, the in-phase modulating signal 131i may be supplied to the in-phase modulator 155i and the quadrature modulating signal 131q may be supplied to the quadrature modulator 155q. As a result, the modulator circuit 150 may output the optical signal 151.

For example, the drive circuit 102 may output a first plurality of electrical signals during the first interval and may output a second plurality of electrical signals during the second interval. Based on the first plurality of electrical signals, the modulation circuit 150 may output a first optical signal having a first in-phase component and a first quadrature component. The first in-phase component may be modulated in accordance with a first tone having the first frequency $\omega_1$ and the first quadrature component may be modulated in accordance with a second tone having the second frequency $\omega_2$. Based on the second plurality of electrical signals, the modulation circuit 150 may output a second optical signal having a second in-phase component and a second quadrature component. The second in-phase component may be modulated in accordance with the second tone having the second frequency $\omega_2$ and the second quadrature component may be modulated in accordance with the first tone having the first frequency $\omega_1$.

As will be understood from FIG. 2, the method 200 may continue indefinitely. However, the specific form of the in-phase pilot signal 113i and the quadrature pilot signal 113q may alternate based on the toggle setting determined at 230. For example, during the first interval, the in-phase pilot signal 113i and the quadrature pilot signal 113q may have a first toggle setting defined by the pilot frequency settings shown in Equations 7 and 8. During the second interval, the in-phase pilot signal 113i and the quadrature pilot signal 113q may have a second toggle setting defined by the pilot frequency settings shown in Equations 12 and 13. If yet another switching at 250 is performed, then the in-phase pilot signal 113i and the quadrature pilot signal 113q may return to the first toggle setting shown in Equations 7 and 8. The method 200 may repeat indefinitely as the pilot frequency settings toggle between first pilot frequency settings and second pilot frequency settings.

Figure 3A:
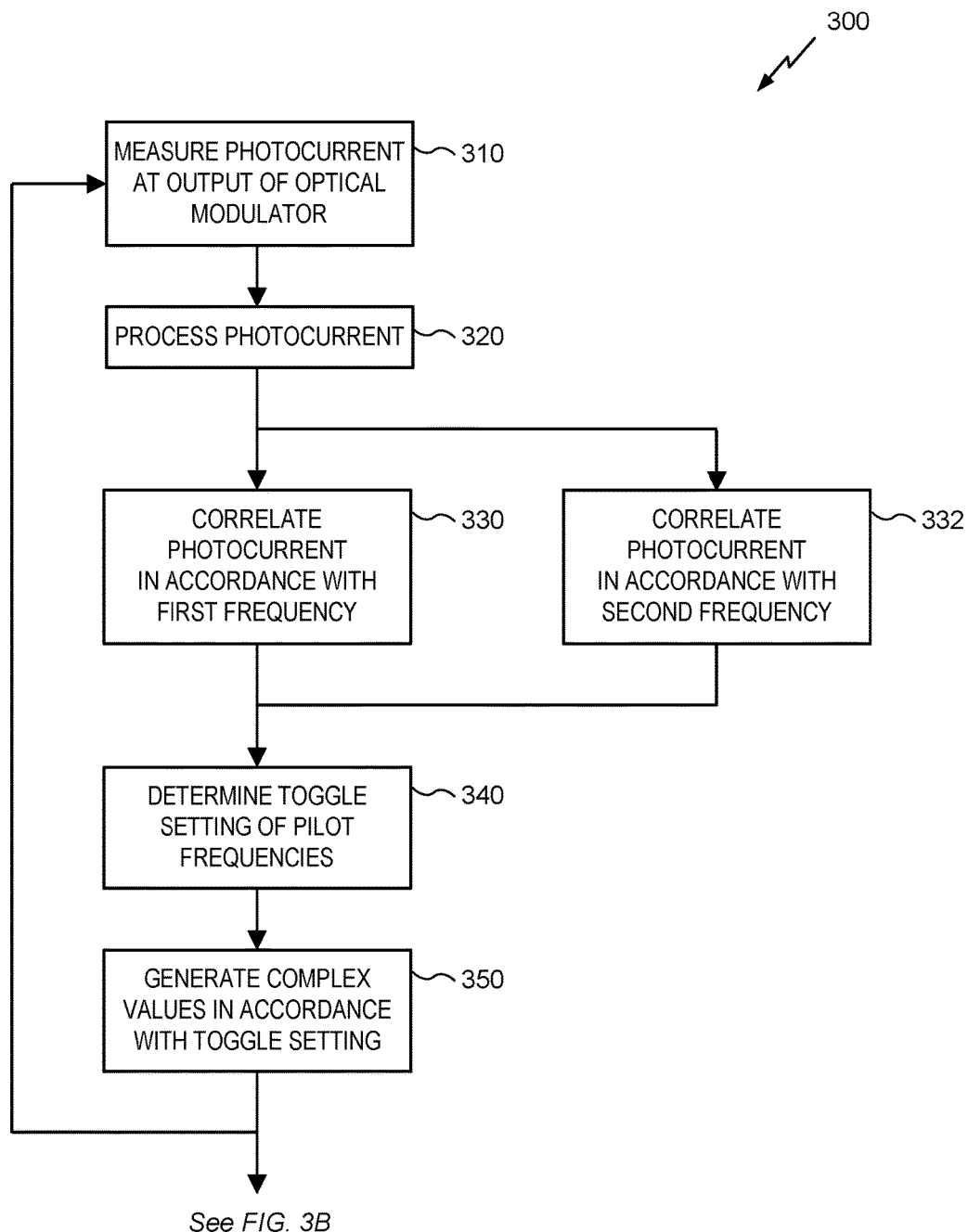
FIG. 3A generally illustrates a first part of a method for monitoring skew based on a plurality of pilot signals.
Figure 3B:
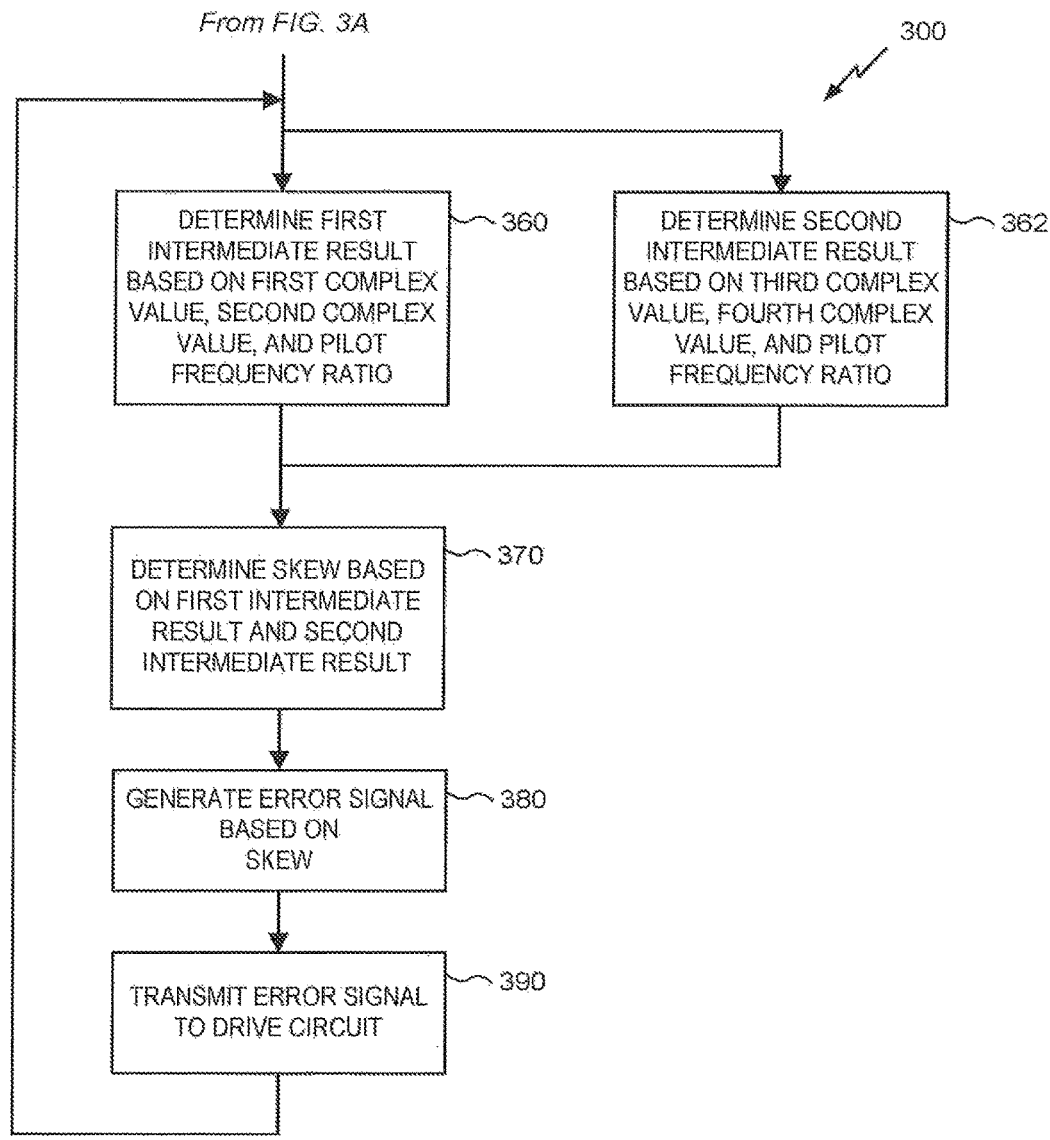
FIG. 3B generally illustrates a second part of a method for monitoring skew based on a plurality of pilot signals, relating to the first part illustrated in FIG. 3A.

FIGS. 3A-3B generally illustrate a method 300 for monitoring skew based on a plurality of pilot signals. The method 300 may be performed while the optical modulation system 100 is in-service. The method 300 will be described below as it would be performed by one or more specific components of the optical modulation system 100 depicted in FIG. 1, in particular, the photodetector 160 and the detector circuit 170. As shown in FIG. 1, the detector circuit 170 may include a first complex correlator 171, a second complex correlator 172, and a skew processor 178. However, it will be understood that the method 300 may be performed by any suitable element or elements in the analog and/or the digital domain.

At 310, the photodetector 160 measures an optical intensity at an output of the modulation circuit 150 to generate a photocurrent 161.

At 320, the detector circuit 170 processes the photocurrent 161 measured at 310. The processing may include, for example, analog-to-digital conversion of the photocurrent 161.

The processing at 320 may further include, for example, filtering of the photocurrent 161. The filtering may include removal of a high-frequency band, as would be performed by a low-pass filter. In some implementations, the photocurrent 161 may be filtered to facilitate recovery of the in-phase pilot signal 113i and/or the quadrature pilot signal 113q. For example, frequencies that are at or near the first frequency $\omega_1$ and/or the second frequency $\omega_2$ may be passed by the filter. In some implementations, the filtering may be performed before or after other forms of processing, for example, analog-to-digital conversion. For example, the photocurrent 161 may be filtered using analog components. Alternatively, the photocurrent 161 may be converted to a digital signal and the detector circuit 170 may perform digital filtering on the photocurrent 161.

The processing at 320 may further include, for example, splitting and/or amplification of the photocurrent 161.

At 330, the detector circuit 170 correlates the photocurrent 161 based on a first frequency $\omega_1$. The first frequency used to demodulate the photocurrent 161 may be equal to the first frequency $\omega_1$ described above in relation to FIG. 2. The result of the correlating at 330 may be referred to as a first complex value $x_A$.

At 332, the detector circuit 170 correlates the photocurrent 161 based on a second frequency $\omega_2$. The second frequency $\omega_2$ used to demodulate the photocurrent 161 may be equal to the second frequency $\omega_2$ described above in relation to FIG. 2. Moreover, a relation between the first frequency $\omega_1$ used to perform the correlating at 330 and the second frequency $\omega_2$ used to perform the correlating at 332 may be based on a pilot frequency ratio n/m, as shown previously in Equation 9. The result of the correlating at 332 may be referred to as a second complex value $x_B$.

The correlating at 330 and the correlating at 332 may be performed in the analog domain using, for example, one or more analog waveform generators, one or more analog mixers, and one or more analog integrators or low-pass filtering components, or in the digital domain using, for example, an ASIC or field-programmable gate array.

The correlating at 330 and the correlating at 332 may be performed, in the digital or analog domain, by multiplying the photocurrent 161 by $e^{j\omega t}$ and integrating the result over a correlation period. It will be understood that for the correlating at 330, ω will be $\omega_1$ and for the correlating at 332, ω will be $\omega_2$.

For example, in order to multiply the photocurrent by $e^{j\omega t}$, the correlating may include multiplying the photocurrent 161 by cos(ωt) and then integrating over the correlation period to obtain a first integration result; multiplying the photocurrent 161 by sin(ωt) and then integrating over the correlation period to obtain a second integration result; and then summing the first integration result with the product of imaginary number j and the second integration result to obtain the complex value.

At 340, the detector circuit 170 determines a toggle setting of pilot frequencies. As noted above in relation to FIG. 2, the toggle setting may be the first toggle setting in which the in-phase pilot frequency $\omega_I$ is set to the first frequency $\omega_1$ and the quadrature pilot frequency $\omega_Q$ is set to the second frequency $\omega_2$, as shown in Equation 7 and Equation 8. Or, the toggle setting may be the second toggle setting in which the in-phase pilot frequency $\omega_I$ is set to the second frequency $\omega_2$ and the quadrature pilot frequency $\omega_Q$ is set to the first frequency $\omega_1$, as shown in Equation 12 and Equation 13. The determining at 340 may be performed by, for example, the skew processor 178.

As noted above with respect to the description of FIG. 2, the determining of the toggle setting at 230 may be made on the basis of a clock signal and/or a toggling signal. The determining of the toggle setting at 340 may also be made on the basis of the clock signal and/or the toggling signal. In some implementations, the drive circuit 102 or some other element of the optical modulation system 100 may generate the clock signal and transmit the clock signal to, for example, the data drive signal generator 110 and the detector circuit 170. The data drive signal generator 110 and the detector circuit 170 may be configured to determine the toggle setting based on the clock signal. Additionally or alternatively, the data drive signal generator 110, the detector circuit 170, or some other element of the optical modulation system may generate the toggling signal and transmit the toggling signal to, for example, the data drive signal generator 110 and the detector circuit 170. The data drive signal generator 110 and the detector circuit 170 may be configured to determine the toggle setting based on the toggling signal.

At 350, the detector circuit 170 generates complex values in accordance with the toggle settings. If the toggle setting is the first toggle setting, then the result of the correlating at 330 may be a first complex value $x_{A,1}$ and the result of the correlating at 332 may be a second complex value $x_{B,1}$. It will be understood that the first complex value $x_{A,1}$ and the second complex value $x_{B,1}$ may be generated during the first interval. If the toggle setting is the second toggle setting, then the result of the correlating at 330 may be a third complex value $x_{A,2}$ and the result of the correlating at 332 may be a fourth complex value $x_{B,2}$. It will be understood that the first complex value $x_A$ and the second complex value $x_{B,2}$ may be generated during the second interval.

The method 300 may further include storing the complex values generated at 350 in a complex values datastore (not shown).

As depicted in FIG. 3A, the detector circuit 170 may then return to the measuring at 310, such that the method 300 continues to generate complex values indefinitely. Moreover, the generating of complex values at 350 may be performed in tandem with the method 200 for generating a plurality of pilot signals. For example, the method 200 may generate a first in-phase pilot signal 113i and a first quadrature pilot signal 113q while the method 300 generates a first complex value $x_{A,1}$ and a second complex value $x_{B,1}$. After a toggling of pilot frequencies, the method 200 may generate a second in-phase pilot signal 113i and a second quadrature pilot signal 113q while the method 300 generates a third complex value $x_{A,2}$ and a fourth complex value $x_{B,2}$. Following another toggling of pilot frequency settings at 260, the process may repeat.

In some implementations, the skew processor 178 calculates and stores an average of past complex values. For example, the skew processor 178 may store a plurality of complex values over a monitoring period. Accordingly, the complex values stored by the skew processor 178 may include an average of a plurality of complex values stored during the monitoring period.

In some implementations, the detector circuit 170 may maintain in storage at least four complex values. These four complex values ($x_{A,1}$, $x_{B,1}$, $x_{A,2}$, and $x_{B,2}$, respectively) may take the form shown in Equations 14-17:

$$x_{A,1}(\tau_{I,1}) \sim e^{j(<F[\omega_1]-\omega_I\tau_{I,1})} \quad \text{Eq. (14)}$$

$$x_{B,1}(\tau_{Q,1}) \sim e^{j(<F[\omega_2]-\omega_Q\tau_{Q,1})} \quad \text{Eq. (15)}$$

$$x_{A,2}(\tau_{Q,2}) \sim e^{j(<F[\omega_1]-\omega_Q\tau_{Q,2})} \quad \text{Eq. (16)}$$

$$x_{B,2}(\tau_{I,2}) \sim e^{j(<F[\omega_2]-\omega_I\tau_{I,2})} \quad \text{Eq. (17)}$$

As will be understood from Equation 14, the first complex value $x_{A,2}$ may be a function of $\tau_{I,1}$, which represents a delay associated with the in-phase data path (optical and electronic) as well as the common delay $\tau_{common}$ described previously. As will be understood from Equation 17, the fourth complex value $x_{B,2}$ may be a function of $\tau_{I,2}$, which represents a delay associated with the in-phase data path (optical and electronic) as well as the common delay $\tau_{common}$ described previously. However, because the common delay $\tau_{common}$ may vary over time (for example, vary over a time in which the method 200 toggles between an first toggle setting and an second toggle setting), the delay $\tau_{I,1}$ may not be equal to the delay $\tau_{I,2}$.

As will be understood from Equation 15, the second complex value $x_{B,1}$ may be a function of $T_{Q,1}$, which represents a delay associated with the quadrature data path (optical and electronic) as well as the common delay $\tau_{common}$ described previously. As will be understood from Equation 16, the third complex value $x_{A,2}$ may be a function of $\tau_{Q,2}$, which represents a delay associated with the quadrature data path (optical and electronic) as well as the common delay $\tau_{common}$ described previously. Because the common delay $\tau_{common}$ may vary over time (for example, vary over a time in which the method 200 toggles between an first toggle setting and an second toggle setting), the delay $\tau_{A,2}$ may not be equal to the delay $\tau_{Q,2}$.

Moreover, each of the four complex values may be affected by a frequency-dependent phase <F[ω]. In particular, the first complex value $x_{A,2}$ and the third complex value $x_{A,2}$ may be affected by the frequency-dependent phase <F[$\omega_1$], whereas the second complex value $x_{B,1}$ and the fourth complex value $x_{B,2}$ may be affected by the frequency-dependent phase <F[$\omega_2$].

As noted above, FIG. 3A shows that the detector circuit 170 may return to the measuring at 310, such that the method 300 continues indefinitely. Accordingly, the method 300 may generate and/or maintain in storage these four complex values ($x_{A,1}$, $x_{B,1}$, $x_{A,2}$, and $x_{B,2}$, respectively). However, the method 300 may also continue to FIG. 3B, where the four complex values are used to determine skew and generate the error signal 179.

At 360 (depicted in FIG. 3B), the detector circuit 170 determines a first intermediate result based on the first complex value $x_{A,1}$, the second complex value $x_{B,1}$, and the pilot frequency ratio n/m, as shown previously in Equation 9. Recall that the pilot frequency ratio n/m may define a relation between the first frequency $\omega_1$ and the second frequency $\omega_2$. The first intermediate result may take the form shown in Equation 18:

$$\frac{x_{A,1}(\tau_{I,1})}{x_{B,1}^{n/m}(\tau_{Q,1})} \sim e^{j(<F[\omega_1]-\omega_1\tau_{I,1}-\frac{n}{m}<F[\omega_2]+\frac{n}{m}\omega_2\tau_{Q,1})} \qquad \text{Eq. (18)}$$

At 362, the method 300 determines a second intermediate result based on the third complex value $x_{A,2}$, the fourth complex value $x_{B,2}$, and the pilot frequency ratio n/m. The second intermediate result may take the form shown in Equation 19:

$$\frac{x_{A,2}(\tau_{Q,2})}{x_{B,2}^{n/m}(\tau_{I,2})} \sim e^{j(<F[\omega_1]-\omega_1\tau_{Q,2}-\frac{n}{m}<F[\omega_2]+\frac{n}{m}\omega_2\tau_{I,2})} \qquad \text{Eq. (19)}$$

At 370, the method 300 determines a skew based on the first intermediate result and the second intermediate result. In particular, the first intermediate result may be divided by the second intermediate result and an angle thereof may be determined. The angle may relate to the differential delay $\Delta\tau$ as shown in Equation 20:

$$\text{angle}\left\{\frac{x_{A,1}(\tau_{I,1})}{x_{B,1}^{n/m}(\tau_{Q,1})}\frac{x_{B,2}^{n/m}(\tau_{I,2})}{x_{A,2}(\tau_{Q,2})}\right\} = -2\omega_1\Delta\tau \qquad \text{Eq. (20)}$$

As will be understood from Equation 20, the frequency-dependent phases $<F[\omega_1]$ and $<F[\omega_2]$ have canceled out. Moreover, the effects of the common delay $\tau_{common}$ have also been eradicated. As proof, consider that the if the first intermediate result is divided by the second intermediate result, as at 370, then the result may take the form shown in Equation 21:

$$\frac{x_{A,1}(\tau_{I,1})}{x_{B,1}^{n/m}(\tau_{Q,1})}\frac{x_{B,2}^{n/m}(\tau_{I,2})}{x_{A,2}(\tau_{Q,2})} \sim e^{j(-\omega_1\tau_{I,1}+\omega_1\tau_{Q,2}+\frac{n}{m}\omega_2\tau_{Q,1}-\frac{n}{m}\omega_2\tau_{I,2})} \qquad \text{Eq. (21)}$$

Based on Equation 9, which relates $\omega_1$ and $\omega_2$ on the basis of the pilot frequency ratio n/m, we can simplify Equation 21 as shown in Equation 22:

$$\frac{x_{A,1}(\tau_{I,1})}{x_{B,1}^{n/m}(\tau_{Q,1})}\frac{x_{B,2}^{n/m}(\tau_{I,2})}{x_{A,2}(\tau_{Q,2})} \sim e^{j(-\omega_1\tau_{I,1}+\omega_1\tau_{Q,2}+\omega_1\tau_{Q,1}-\omega_1\tau_{I,2})} \qquad \text{Eq. (22)}$$

Moreover, Equation 22 may be further simplified as shown in Equation 23:

$$\frac{x_{A,1}(\tau_{I,1})}{x_{B,1}^{n/m}(\tau_{Q,1})}\frac{x_{B,2}^{n/m}(\tau_{I,2})}{x_{A,2}(\tau_{Q,2})} \sim e^{j\omega_1(-\tau_{I,1}+\tau_{Q,2}+\tau_{Q,1}-\tau_{I,2})} \qquad \text{Eq. (23)}$$

If it is further assumed that the differential delay $\Delta\tau=\tau_I-\tau_Q$ does not change over a time in which the method 200 toggles between the first toggle setting and the second toggle setting, then differential delay $\Delta\Sigma=\tau_{I,1}-\tau_{Q,1}=\tau_{I,2}-\tau_{Q,2}$. Accordingly, Equation 23 may be further simplified as shown in Equation 24:

$$\frac{x_{A,1}(\tau_{I,1})}{x_{B,1}^{n/m}(\tau_{Q,1})}\frac{x_{B,2}^{n/m}(\tau_{I,2})}{x_{A,2}(\tau_{Q,2})} \sim e^{j\omega_1(-2\Delta\tau)} \qquad \text{Eq. (24)}$$

Accordingly, it will be understood that if the first intermediate result is divided by the second intermediate result, an angle thereof may relate to the differential delay $\Delta\tau$, as shown in Equation 20.

At 380, the method 300 generates an error signal based on the differential delay $\Delta\tau$ determined at 370. The error signal may be analogous to the error signal 179 depicted in FIG. 1.

At 390, the method 300 transmits the error signal 179 generated at 380 to the drive circuit 102. In some implementations, the error signal 179 may be transmitted to the data drive signal generator 110 depicted in FIG. 1. The error signal 179 transmitted at 380 may be used to adjust the differential delay $\Delta\tau$ through the use of, for example, re-configurable electronic filters in the I and Q data paths. The adjusting may be performed while the optical modulation system 100 is in-service.

After the transmitting at 390, the method 300 may return to the determining at 360 and the determining at 362, thereby regenerating and retransmitting the error signal 179 as new complex values are generated.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electrical hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus, comprising:
a drive circuit that selectively supplies a first plurality of electrical signals and a second plurality of electrical signals; and
a modulation circuit coupled to the drive circuit, such that:
based on the first plurality of electrical signals, the modulation circuit outputs a first optical signal having a first in-phase component and a first quadrature component, the first in-phase component being modulated in accordance with a first tone having a first frequency and the first quadrature component being modulated in accordance with a second tone having a second frequency different than the first frequency, and
based on the second plurality of electrical signals, the modulation circuit outputs a second optical signal having a second in-phase component and a second quadrature component, the second in-phase component being modulated in accordance with the second tone having the second frequency and the second quadrature component being modulated in accordance with the first tone having the first frequency.

2. The apparatus of claim 1, further comprising a laser that supplies continuous-wave light to the modulation circuit.

3. The apparatus of claim 1, wherein the modulation circuit comprises nested Mach-Zehnder modulators including a first optical modulator and a second optical modulator.

4. The apparatus of claim 1, wherein the first frequency and the second frequency are set based on a pilot frequency ratio, such that $$\omega_1 = \left[\frac{n}{m}\right]\omega_2,$$

wherein $\omega_1$ is the first frequency, $\omega_2$ is the second frequency, and $$\frac{n}{m}$$

is the pilot frequency ratio, the pilot frequency ratio having a numerator n that is a first integer and a denominator m that is a second integer different than the first integer.

5. The apparatus of claim 1, wherein:
the drive circuit selectively supplies the first plurality of electrical signals during a first interval and selectively supplies the second plurality of electrical signals during a second interval subsequent to the first interval; and
switching from selective supply of the first plurality of electrical signals to selective supply of the second plurality of electrical signals is based on a toggling signal.

6. An apparatus, comprising:
a drive circuit that supplies, during a first time interval, first in-phase drive signals that are modulated in accordance with a first electrical tone and first quadrature drive signals that are modulated in accordance with a second electrical tone, the first electrical tone having a first frequency and the second electrical tone having a second frequency,
wherein during a second time interval, the drive circuit supplies second in-phase drive signals that are modulated in accordance with the second electrical tone having the second frequency and second quadrature drive signals that are modulated in accordance with the first electrical tone having the first frequency, the first frequency being different than the second frequency,
such that, based on the first in-phase and first quadrature drive signals during the first time interval, a modulator outputs a first optical signal including: a first in-phase component modulated to have a first optical tone at the first frequency; and a first quadrature component modulated to have a second optical tone at the second frequency, and
based on the second in-phase and second quadrature drive signals during the second time interval, the modulator outputs a second optical signal including: a second in-phase component modulated to have the second optical tone at the second frequency; and a second quadrature component modulated to have the first optical tone at the second frequency.

7. The apparatus of claim 6, wherein the first frequency and the second frequency are set based on a pilot frequency ratio, such that $$\omega_1 = \left[\frac{n}{m}\right]\omega_2,$$

wherein $\omega_1$ is the first frequency, $\omega_2$ is the second frequency, and $$\frac{n}{m}$$

is the pilot frequency ratio, the pilot frequency ratio having a numerator n that is a first integer and a denominator m that is a second integer different than the first integer.

8. The apparatus of claim 6, wherein:
the drive circuit selectively supplies the first plurality of electrical signals during a first interval and selectively supplies the second plurality of electrical signals during a second interval subsequent to the first interval.

9. The apparatus of claim 6, wherein:
the first in-phase drive signals and the second in-phase drive signals each include an in-phase data drive signal based on a data signal received by the drive circuit; and
the first quadrature drive signals and the second quadrature drive signals each include a quadrature data drive signal based on the data signal received by the drive circuit.

10. The apparatus of claim 9, wherein:
the first in-phase drive signals are modulated in accordance with the first electrical tone by amplitude-modulating a carrier frequency in accordance with the first electrical tone and adding the amplitude-modulated carrier frequency to the in-phase data drive signal;
the first quadrature drive signals are modulated in accordance with the second electrical tone by amplitude-modulating the carrier frequency in accordance with the second electrical tone and adding the amplitude-modulated carrier frequency to the quadrature data drive signal;
the second in-phase drive signals are modulated in accordance with the second electrical tone by amplitude-modulating the carrier frequency in accordance with the second electrical tone and adding the amplitude-modulated carrier frequency to the in-phase data drive signal;
the second quadrature drive signals are modulated in accordance with the first electrical tone by amplitude-modulating the carrier frequency in accordance with the first electrical tone and adding the amplitude-modulated carrier frequency to the quadrature data drive signal.

11. The apparatus of claim 10, wherein:
the in-phase data drive signal and the quadrature data drive signal are higher-frequency than each of the first electrical tone and the second electrical tone; and
each of the first electrical tone and the second electrical tone are higher-frequency than the carrier frequency.

12. An apparatus, comprising:
a drive circuit that selectively supplies a first plurality of electrical signals and a second plurality of electrical signals;
a modulation circuit coupled to the drive circuit, such that:
based on the first plurality of electrical signals, the modulation circuit outputs a first optical signal having a first in-phase component and a first quadrature component, the first in-phase component being modulated in accordance with a first tone having a first frequency and the first quadrature component being modulated in accordance with a second tone having a second frequency different than the first frequency, and
based on the second plurality of electrical signals, the modulation circuit outputs a second optical signal having a second in-phase component and a second quadrature component, the second in-phase component being modulated in accordance with the second tone having the second frequency and the second quadrature component being modulated in accordance with the first tone having the first frequency; and
a detector circuit that supplies an error signal based on a portion of at least one of the first and second optical signals, the detector circuit supplying third electrical signals to the modulation circuit based on the error signal.

13. The apparatus of claim 12, wherein:
the drive circuit selectively supplies the first plurality of electrical signals during a first interval and selectively supplies the second plurality of electrical signals during a second interval subsequent to the first interval; and
the modulation circuit outputs the first optical signal during the first interval and outputs the second optical signal during the second interval.

14. The apparatus of claim 12, wherein the first plurality of electrical signals and the second plurality of electrical signals each include:
an in-phase data drive signal based on a data signal received by the drive circuit; and
a quadrature data drive signal based on the data signal received by the drive circuit;
wherein the drive signal receives the error signal from the modulation circuit and adjusts a relative phase between the in-phase data drive signal and the quadrature data drive signal based on the error signal.

15. The apparatus of claim 12, wherein the detector circuit:
measures an optical intensity at an output of the optical modulator to generate a photocurrent based on the first and second optical signals; and
processes the photocurrent, wherein the processing includes analog-to-digital converting the photocurrent, filtering the photocurrent, splitting the photocurrent, or any combination thereof.

16. The apparatus of claim 15, wherein the detector circuit generates a plurality of complex values based on the photocurrent, wherein each of the plurality of complex values is generated by:
multiplying the photocurrent by $\cos(\omega t)$ and integrate the result over a correlation period to obtain a first integration result, wherein $\omega$ is a demodulation frequency and t is time;
multiplying the photocurrent by $\sin(\omega t)$ and integrate the result over a correlation period to obtain a second integration result; and
summing (i) the first integration result and (ii) the product of imaginary number j and the second integration result.

17. The apparatus of claim 16, wherein during the first interval, the detector circuit generates a first complex value $x_{A,1}$ ($\tau_{I,1}$) and a second complex value $x_{B,1}$ ($\tau_{Q,1}$) of the plurality of complex values, and during the second interval, the detector circuit further generates a third complex value $x_{A,2}$ ($\tau_{Q,2}$) and a fourth complex value $x_{B,2}$ ($\tau_{I,2}$) of the plurality of complex values during the second interval, and wherein:
to generate the first complex value and the third complex value, the detector circuit sets the demodulation frequency $\omega$ to a first frequency; and
to generate the second complex value and the fourth complex value, the detector circuit sets the demodulation frequency $\omega$ to a second frequency.

18. The apparatus of claim 17, wherein the first frequency and the second frequency are set based on a pilot frequency ratio, such that $$\omega_1 = \left[\frac{n}{m}\right]\omega_2,$$

wherein $\omega_1$ is the first frequency, $\omega_2$ is the second frequency, and $$\frac{n}{m}$$

is the pilot frequency ratio, the pilot frequency ratio having a numerator n that is a first integer and a denominator m that is a second integer different than the first integer.

19. The apparatus of claim 18, wherein the error signal supplied by the detector circuit indicates a skew of the in-phase data drive signal and the quadrature data drive signal.

20. The apparatus of claim 19, wherein the detector circuit generates the error signal by:

combining the first complex value $x_{A,1}(\tau_{I,1})$ the second complex value $x_{B,1}(\tau_{Q,1})$, the third complex value $x_{A,2}(\tau_{Q,2})$, the fourth complex value $x_{B,2}(\tau_{I,2})$, and the pilot frequency ratio $$\frac{n}{m}$$

in accordance with the following equation:

$$\frac{x_{A,1}(\tau_{I,1})}{x_{B,1}^{n/m}(\tau_{Q,1})} \frac{x_{B,2}^{n/m}(\tau_{I,2})}{x_{A,2}(\tau_{Q,2})}; \text{ and}$$

determining an angle of the resulting combination.

* * * * *